US012007969B2

(12) United States Patent
Baghabrah et al.

(10) Patent No.: US 12,007,969 B2
(45) Date of Patent: Jun. 11, 2024

(54) AUTOMATIC COMPUTER DATA DEDUPLICATION PROCESS FOR APPLICATION WHITELISTING SYSTEM

(71) Applicant: SAUDI ARABIAN OIL COMPANY, Dhahran (SA)

(72) Inventors: Dana Baghabrah, Al Khobar (SA); Aseel Alomair, Dammam (SA); Asma Soleja, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 64 days.

(21) Appl. No.: 17/819,222

(22) Filed: Aug. 11, 2022

(65) Prior Publication Data

US 2024/0054113 A1 Feb. 15, 2024

(51) Int. Cl.
*G06F 16/00* (2019.01)
*G06F 16/215* (2019.01)
*G06F 21/62* (2013.01)

(52) U.S. Cl.
CPC .......... *G06F 16/215* (2019.01); *G06F 21/629* (2013.01)

(58) Field of Classification Search
CPC .............................. G06F 16/215; G06F 21/629
See application file for complete search history.

(56) References Cited

U.S. PATENT DOCUMENTS

| | | | |
|---|---|---|---|
| 10,659,434 B1 * | 5/2020 | Kim | H04L 63/101 |
| 11,119,984 B2 * | 9/2021 | Attarde | G06F 3/0641 |
| 2011/0087692 A1 * | 4/2011 | Masone | G06F 9/5027 |
| | | | 709/224 |
| 2014/0067776 A1 * | 3/2014 | Larson | G06F 16/1748 |
| | | | 707/692 |
| 2014/0068772 A1 * | 3/2014 | Topan | G06F 21/563 |
| | | | 726/23 |
| 2017/0193003 A1 * | 7/2017 | Vijayan | G06F 3/0647 |
| 2020/0228528 A1 * | 7/2020 | Chen | H04L 9/0894 |
| 2021/0064730 A1 * | 3/2021 | Schrag | H04L 67/04 |
| 2022/0083672 A1 * | 3/2022 | Riley | G06F 21/51 |

* cited by examiner

*Primary Examiner* — Jared M Bibbee
(74) *Attorney, Agent, or Firm* — Osha Bergman Watanabe & Burton LLP (57) ABSTRACT

A method to perform application whitelisting for a computer system is disclosed. The method includes detecting, in an application whitelisting database of the computer system, that a first agent entry and a second agent entry have a same machine name within the computer system, recording, in a duplicates repository separate from the application whitelisting database, the first agent entry and the second agent entry, detecting, in the duplicates repository separate from the application whitelisting database, that the first agent entry has a connected status, recording, in a connected duplicates repository separate from the application whitelisting database, the first agent entry based on the connected status, determining, by at least comparing the duplicates repository and the connected duplicates repository, that the second agent entry is a disconnected duplicate of the first agent entry, and deleting, in response to said determining, the second agent entry from the application whitelisting database.

20 Claims, 4 Drawing Sheets

| Name | id | ip | Policy | DaysOf | CLIPasswod | Action |
|---|---|---|---|---|---|---|
| xxxxxxxx | xxxxxx | xxxxxx | Deleted | 646 | xxxxxxxxx | Deleted |
| xxxxxxxx | xxxxxx | xxxxxx | Staging | 623 | xxxxxxxxx | Policy for Connected was Disabled, Changed to Staging |
| xxxxxxxx | xxxxxx | xxxxxx | Deleted | 15 | xxxxxxxxx | Deleted |

AUTOMATIC COMPUTER DATA DEDUPLICATION PROCESS FOR APPLICATION WHITELISTING SYSTEM

BACKGROUND

Application whitelisting is the practice of specifying an index of approved software applications or executable files that are permitted to be present and active on a computer system. The specified indices are stored in an application whitelisting database. The goal of whitelisting is to protect computers and networks from potentially harmful applications. In an organization with large number of users, an information technology (IT) analyst may oversee thousands of potentially duplicate machines recorded in the application whitelisting database. It is difficult and time consuming for the IT analyst to manually go through the application whitelisting database to find the connected machines and delete disconnected duplicates. After manually deleting a disconnected machine, any record of information may no longer exist for the analyst to go back for review.

SUMMARY

In general, in one aspect, the invention relates to a method to perform application whitelisting for a computer system. The method includes detecting, in an application whitelisting database of the computer system, that a first agent entry and a second agent entry have a same machine name within the computer system, recording, in a duplicates repository separate from the application whitelisting database, the first agent entry and the second agent entry, detecting, in the duplicates repository separate from the application whitelisting database, that the first agent entry has a connected status, recording, in a connected duplicates repository separate from the application whitelisting database, the first agent entry based on the connected status, determining, by at least comparing the duplicates repository and the connected duplicates repository, that the second agent entry is a disconnected duplicate of the first agent entry, and deleting, in response to said determining, the second agent entry from the application whitelisting database.

In general, in one aspect, the invention relates to a system. The system includes a computer processor, and memory storing instructions, when executed, causing the computer processor to detect, in an application whitelisting database of a computer system, that a first agent entry and a second agent entry have a same machine name within the computer system, record, in a duplicates repository separate from the application whitelisting database, the first agent entry and the second agent entry, detect, in the duplicates repository separate from the application whitelisting database, that the first agent entry has a connected status, record, in a connected duplicates repository separate from the application whitelisting database, the first agent entry based on the connected status, determine, by at least comparing the duplicates repository and the connected duplicates repository, that the second agent entry is a disconnected duplicate of the first agent entry, and delete, in response to said determining, the second agent entry from the application whitelisting database.

In general, in one aspect, the invention relates to an application whitelisting system. The application whitelisting system includes an application whitelisting database of a computer system, a duplicates repository separate from the application whitelisting database, a connected duplicates repository separate from the application whitelisting database, a computer processor, and memory storing instructions, when executed, causing the computer processor to detect, in the application whitelisting database, that a first agent entry and a second agent entry have a same machine name within the computer system, record, in the duplicates repository, the first agent entry and the second agent entry, detect, in the duplicates repository, that the first agent entry has a connected status, record, in the connected duplicates repository, the first agent entry based on the connected status, determine, by at least comparing the duplicates repository and the connected duplicates repository, that the second agent entry is a disconnected duplicate of the first agent entry, and delete, in response to said determining, the second agent entry from the application whitelisting database.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for performing application whitelisting for a computer system by automatically deleting disconnected duplicates of existing connected software agents in the computer system. In one or more embodiments, in an application whitelisting database of the computer system, a first agent entry and a second agent entry are detected as having a same machine name within the computer system. The first agent entry and the second agent entry are then recorded in a duplicates repository separate from the application whitelisting database. Subsequently, in the duplicates repository, it is determined that the first agent entry has a connected status such that the first agent entry is recorded based on the connected status in a connected duplicates repository separate from the application whitelisting database. By at least comparing the duplicates repository and the connected duplicates repository, it is determined that the second agent entry is a disconnected duplicate of the first agent entry. In response to such determination, the second agent entry is deleted from the application whitelisting database. In one or more embodiments, the disconnected agent's policy is checked and changed if the policy was disabled, and its information is recorded in a disconnected repository before being deleted from the application whitelisting database.

Figure 1:
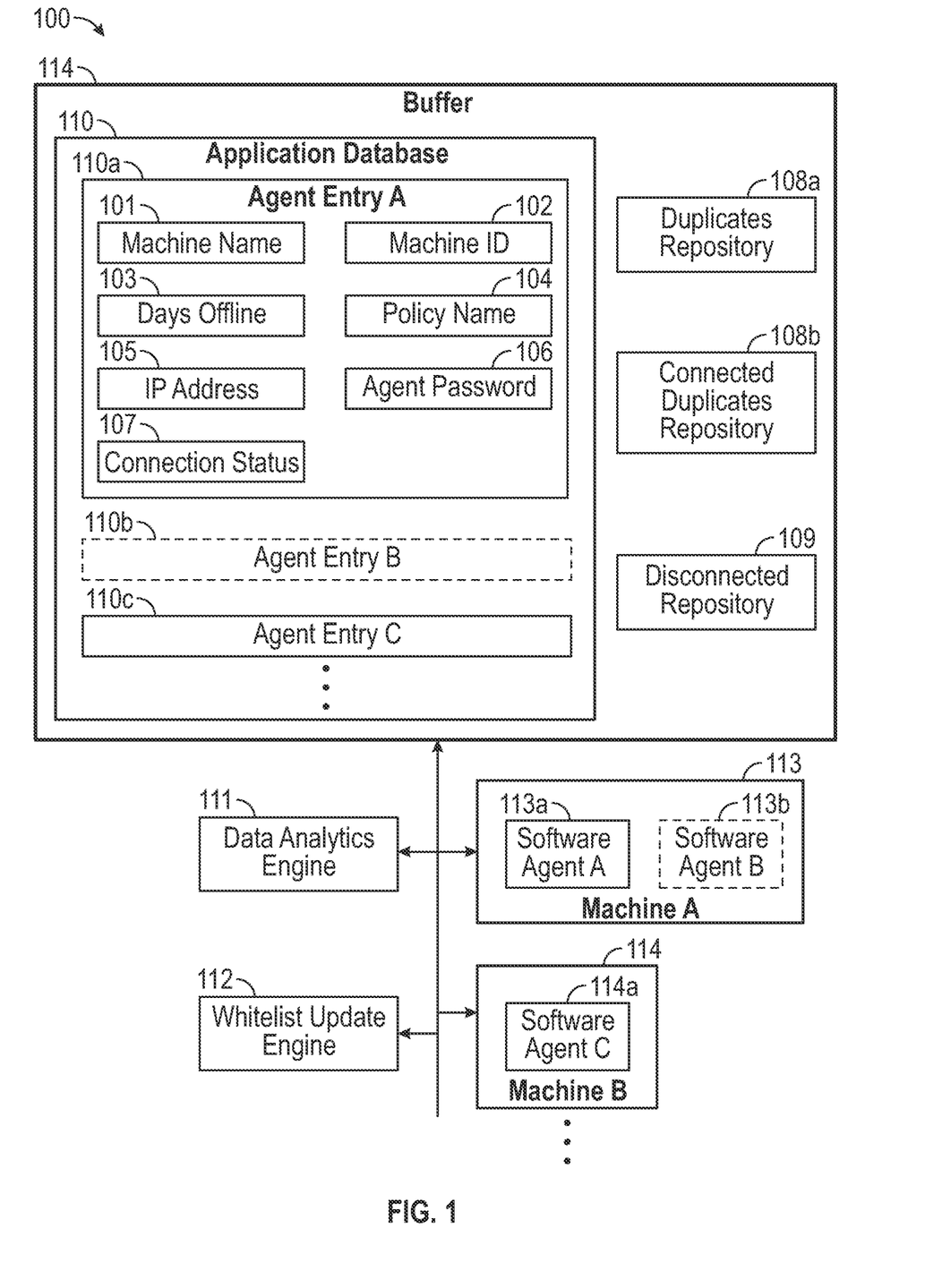
FIG. 1 shows a system in accordance with one or more embodiments.

FIG. 1 shows a block diagram of a system (100) in accordance with one or more embodiments disclosed herein. Specifically, the system (100) corresponds to a computing system of an enterprise organization that has large number of interconnected computers for users of the enterprise and is administrated by one or more IT analysts. In one or more embodiments, one or more of the modules and/or elements shown in FIG. 1 may be omitted, repeated, and/or substituted. Accordingly, embodiments disclosed herein should not be considered limited to the specific arrangements of modules and/or elements shown in FIG. 1.

As shown in FIG. 1, the system (100) has multiple components, including, for example, a buffer (114), a data analytics engine (111), a whitelist update engine (112), and multiple machines of a computer system such as machine A (113), machine B (114), etc. that are used by users of an enterprise organization. Each of these components is discussed below.

In one or more embodiments, the buffer (114) may be implemented in hardware (i.e., circuitry), software, or any combination thereof. The buffer (114) is configured to store input data, output results, and intermediate data of the data analytics engine (111) and the whitelist update engine (112). In one or more embodiments, the buffer (114) stores an application data base (110), a duplicates repository (108a), a connected duplicates repository (108b), and a disconnected repository (109). The application database (110) is a database for managing individual machines of the system (100) by way of respective agent entries (e.g., agent entry A (110a), agent entry B (110b), agent entry C (110c)) stored in the application database (110). The term "machine" refers to a computer or any type of computing device, such as the machine A (113), machine B (114), etc. Each agent entry corresponds to a software agent (e.g., software agent A (113a), software agent B (113b), software agent C (114a)) where the content of the agent entry specifies a machine found in the system (100) where the software agent is installed. Each software agent is a computer program installed on a machine to act for a user or other program in a relationship of agency. In this context, the machine is referred to as a host of the software agent. In one or more embodiments, the application database (110) is an application whitelisting database.

In one or more embodiments, the agent entry A (110a) includes multiple data fields, such as a machine name (101), a machine identifier (ID) (102), days offline (103), a policy name (104), an internet protocol (IP) address (105), an agent password (106), and a connection status (107). The machine name (101) is the name of the machine (i.e., machine A (113)) found in the system (100) (this can be duplicated) where the software agent A (113a) associated with the agent entry A (110a) is installed. Correspondingly, the machine ID (102) is a unique identifier of the machine where the software agent of the agent entry A (110a) is installed. Two machines or their agent entries may have the same machine name but have different, unique machine IDs. The policy name (103) is the name of the policy (e.g., unused, staging, high enforcement, etc.) the software agent of the agent entry A (110a) belongs to. The IP address (105) is the last known IP address of the machine where the software agent of the agent entry A (110a) is installed. The agent password (106) is the password of the software agent installed on the machine. The agent password (106) is used to configure administrator actions of the software agent installed on the machine. The connection status (107) is the current connection status (e.g., "connected", "disconnected") of the software agent installed on the machine. The days offline (103) is the number of days (e.g., 0 days, 90 days, etc.) the software agent is offline and not connected to the system and unable to be reached.

The machine name may be duplicated in the application database (110) where multiple agent entries may have the same machine name. Machine duplicates are a group of agent entries having the same machine name. For example, the machine name (101) may be duplicated in the agent entry B (110b). In other words, both the agent entry A (110a) and agent entry B (110b) have the same machine name (101) but different machine IDs. In this context, the agent entry A (110a) and agent entry B (110b) are referred to as machine duplicates where each of the agent entry A (110a) and agent entry B (110b) is referred to as a duplicate agent entry. Each of the associated software agent A (113a) and software agent B (113b) is referred to as a duplicate software agent. In contrast, the agent entry C (110c) corresponds to the software agent C (114a) that does not have any duplicate.

In the example scenario above, the agent entry B (110b) has the same machine name and machine ID as the agent entry A (110a). This indicates that the software agent B (113b) associated with the agent entry B (110b) and the software agent A (113a) associated the agent entry A (110a) are installed on the same machine, i.e., machine A (113). However, the agent entry B (110b) has different policy name, different agent password, and/or different connection status than those of the agent entry A (110a). While the connection status (107) of the agent entry A (110a) is "connected", the software agent B (113b) has not been connected to the system (100) for a time period (e.g., 10 days) exceeding a pre-determined limit (e.g., 24 hours). As a result, the days offline field of the agent entry B (110b) shows 10 days, and the connection status of the agent entry B (110b) is "disconnected." The software agent A (113a) is referred to as a connected software agent, and the software agent B (113b) is referred to as a disconnected software agent, as indicated by the dashed outlines in FIG. 1. The IP addresses of the agent entry A (110a) and the agent entry B (110b) may be the same as or different from each other.

The duplicates repository (108a) is a list or other type of data repository that records duplicate machines in the system (100). In one or more embodiments, the duplicates repository (108a) records machine duplicates in the application database (110). Specifically, the duplicates repository (108a) is separate from the application database (110). In the example scenario above, the duplicates repository (108a) includes the machine duplicates identified by the machine name (101) and machine ID (102) that are duplicated in the agent entry A (110a) and the agent entry B (110b). In other words, the duplicates repository (108a) stores the connected agent entry A (110a) and the disconnected agent entry B (110b) as the machine duplicates of the machine A (113).

The connected duplicates repository (108b) is a list or other type of depository that records connected duplicate machines in the system (100), i.e., duplicate machines with connected software agents. In one or more embodiments, the connected duplicates repository (108b) records duplicate agent entries having connected status (i.e., associated with a connected duplicate software agent) in the application database (110). Specifically, the connected duplicates repository (108b) is separate from the application database (110). In the example scenario above, for the machine duplicates of the machine A (113), the connected duplicates repository (108b) includes the agent entry A (110a) but not the agent entry B (110b).

The disconnected repository (109) is a list or other type of data repository that records disconnected duplicate machines in the system (100). In one or more embodiments, the disconnected repository (109) records duplicate agent entries having disconnected status (i.e., associated with a disconnected duplicate software agent) in the application database (110). Specifically, the disconnected repository (109) is separate from the application database (110). In the example scenario above, for the machine duplicates of the machine A (113), the disconnected repository (109) includes the agent entry B (110b) but not the agent entry A (110a).

In one or more embodiments, the data analytics engine (111) may be implemented in hardware (i.e., circuitry), software, or any combination thereof. The data analytics engine (111) is configured to collect and store data for the agent entries, such as the machine name, unique ID, policy name, days offline, agent password, IP address, and connection status.

In one or more embodiments, the whitelist update engine (112) may be implemented in hardware (i.e., circuitry), software, or any combination thereof. The whitelist update engine (112) is configured to search through all software agent entries and compare machine duplicates to identify connected and disconnected software agents. Specifically, the whitelist update engine (112) uses the machine name and connection status as the search key to check if any connected machine has a disabled policy (i.e., unused policy for software agent). If a connected machine is disabled, e.g., the connected agent entry A (110a) has the policy name (104) as "unused", the whitelist update engine (112) changes its policy (e.g., policy name (104)) from "unused" to "staging" and deletes the machine through unique ID. The staging policy is a transition policy before converting to high enforcement policy. If a connected machine is not disabled, e.g., the connected agent entry A (110a) has the policy name (104) as "staging" or "high enforcement", the whitelist update engine (112) deletes the machine through unique ID. More specifically, the whitelist update engine (112) deletes the disconnected agent entry B (110b) from application database (110) and ensure all computer information are recorded before deletion in a report (discussed in FIG. 2 below). In one or more embodiments, the whitelist update engine (112) performs the functions above using the method described in reference to FIG. 2 below.

Although the system (100) is shown as having four components (111, 112, 113, 114), in other embodiments, the system (100) may have more or fewer components. Further, the functionality of each component described above may be split across multiple components. Further still, each component (111, 112, 113, 114) may be utilized multiple times to carry out an iterative operation.

Figure 2:
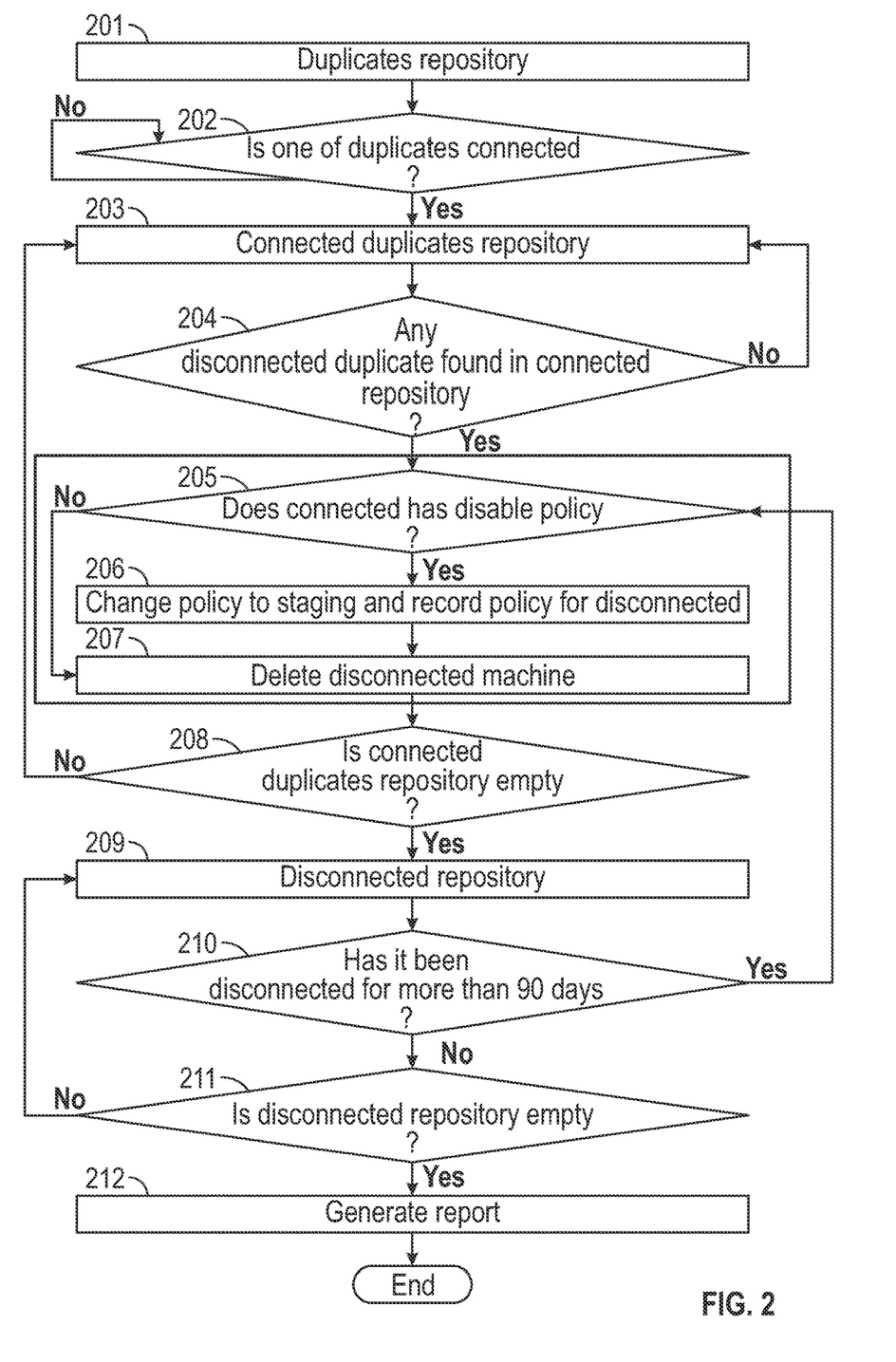
FIG. 2 shows a method flowchart in accordance with one or more embodiments.

FIG. 2 shows a flowchart in accordance with one or more embodiments disclosed herein. One or more of the steps in FIG. 2 may be performed by the components of system (100), discussed above in reference to FIG. 1. In one or more embodiments, one or more of the steps shown in FIG. 2 may be omitted, repeated, and/or performed in a different order than the order shown in FIG. 2. Accordingly, the scope of the disclosure should not be considered limited to the specific arrangement of steps shown in FIG. 2.

Referring to FIG. 2, initially in Step 200, a duplicates repository (e.g., duplicates repository (108a) depicted in FIG. 1) is retrieved for analysis. The duplicates repository is generated to record machine duplicates in an application database (e.g., application database (110) depicted in FIG. 1), such as an application whitelisting database. Specifically, two or more agent entries that have the same machine name and have the same machine ID are identified and recorded as a set of machine duplicates. The machine duplicates are recorded by storing a reference, a link, a copy, or other identification mechanism of respective agent entries (e.g., agent entry A (110a), agent entry B (110b)) in the duplicates repository. Multiple sets of machine duplicates may be recorded in the duplicates repository.

In Step 202, the duplicates repository (e.g., duplicates repository (108a) depicted in FIG. 1) is iteratively checked to determine if one of the machine duplicates has a software agent connected to the system. If the checked machine duplicates do not have a connected software agent, the next machine duplicates in the duplicates repository is checked through an iteration loop. Through the iterations, the connection status field of each agent entry of all machine duplicates is checked to identify all duplicate agent entries having the "connected" status.

In Step 203, all duplicate agent entries (e.g., agent entry A (110a)) having the "connected" status are added to a connected duplicates repository (e.g., connected duplicates repository (108b) depicted in FIG. 1) to record the connected duplicate machines (e.g., machine A (113)) in the system.

In Step 204, the duplicates repository (e.g., duplicates repository (108a) depicted in FIG. 1) is checked to determine if there is any disconnected agent (e.g., agent entry B (110b)) that has the same machine name found in the connected duplicates repository (e.g., connected duplicates repository (108b) depicted in FIG. 1). In one or more embodiments, this determination is made by comparing the duplicates repository and the connected duplicates repository. If the answer to the question above is "yes", i.e., a disconnected agent is found (e.g., the disconnected agent entry B (110b) in the duplicates repository (108a) has the same hostname as the connected agent entry A (110a) found in the connected duplicates repository (109)), the method proceeds to Step 205. Otherwise, if the answer is "no", the method returns to Step 203.

In Step 205, in the case that a disconnected agent is found in Step 204 above, the policy of the disconnected agent is checked to determine if the agent policy is disabled. In other words, if the disconnected agent is currently not operating and needs to be assigned to an active policy. If the agent policy is disabled (e.g., the disconnected agent entry B (110b) in the duplicates repository (108a) has a disabled policy, the method proceeds to Step 206. Otherwise, if the agent policy is not disabled, the method proceeds to Step 207.

In Step 206, in the case that the disconnected agent found in Step 204 has a disabled agent policy, the connected duplicate policy is changed to staging (e.g., if the disconnected agent entry B (110b) has a disabled policy, the connected agent entry A (110a) found in the connected duplicates repository (109) is changed to staging policy. Staging policy means that the software agent A (113a) will wait until becoming fully synchronized and connected to the application control system, before activating the software agent A (113a) and putting into high enforcement. For example, the policy name (104) depicted in FIG. 1 above will be changed to its correct state.

In Step 207, the disconnected duplicate is deleted from the application database, e.g., the disconnected agent entry B (110b) is deleted. Once the disconnected agent entry B (110b) is deleted from the application data base, the agent entry A (110a) and agent entry B (110b) are no longer machine duplicates and are removed from the duplicates repository. In Step 208, it is checked if the connected duplicate repository (108) is empty. If the connected duplicate repository (108) is empty, the method proceeds to Step 209. If the connected duplicate repository (108) is not empty, the method returns to Step 203.

In Step 209, in the case that the connected duplicate repository (108) is empty, the disconnected agents are processed. The disconnected repository (109) is generated to retrieve other disconnected agents without duplicates. In other words, after cleaning up the machines that have online status, the machines having only disconnected duplicates, i.e., do not have a machine with a connected status, are checked. In one or more embodiments, the disconnected repository (109) is formatted as a comma-separated-values (CSV) file.

In Step 210, it is checked if a machine's software agent has been disconnected for more than 90 days, e.g., if the disconnected agent entry B (110b) shows more than 90 days in the "days offline". If yes, the method returns to Step 205 to go through the deleting process. Otherwise, if the disconnected agent entry B (110b) shows less than 90 days in the "days offline", the method continues to Step 211.

In Step 211, in the case that the disconnected software agent is disconnected less than 90 days, it is checked if the disconnected repository (119) is empty. If the disconnected repository (119) is not empty, the method returns to Step 209 to get next disconnected machine to process.

In Step 2012, if the disconnected repository (119) is empty, a final report is generated that includes all agent entry information, such as machine name, policy name, days offline, agent password, IP address, etc. The final report includes deleted machines and machines that had their policy changed.

Figure 3:
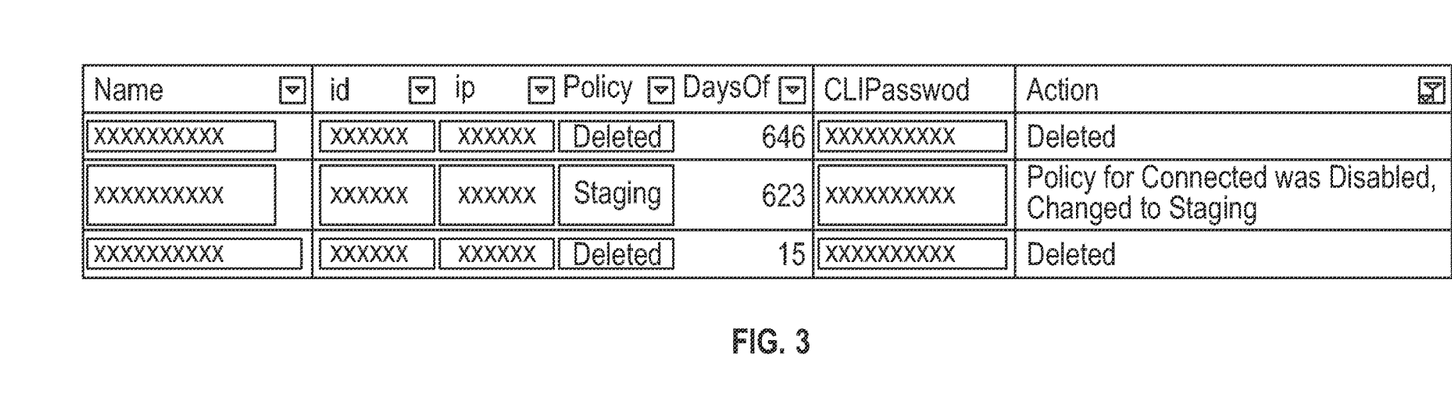
FIG. 3 shows an example in accordance with one or more embodiments.

FIG. 3 shows an example final report in CSV format. Specifically, the example final report includes three entries organized under seven columns, namely Machine Name, Machine ID, IP address, DaysOffline, Policy Name, Agent Password, and Action. In particular, the column "Action" shows if the machine was deleted or had its policy changed.

Embodiments provide the advantages that the number of times analysts need to investigate the whitelisting database is reduced, that the space of the whitelisting database is dynamically reduced while increasing the operation efficiency, and that no loss of record occurs when deleting the disconnected duplicates as their parameters are automatically logged prior to being deleted.

Figure 4:
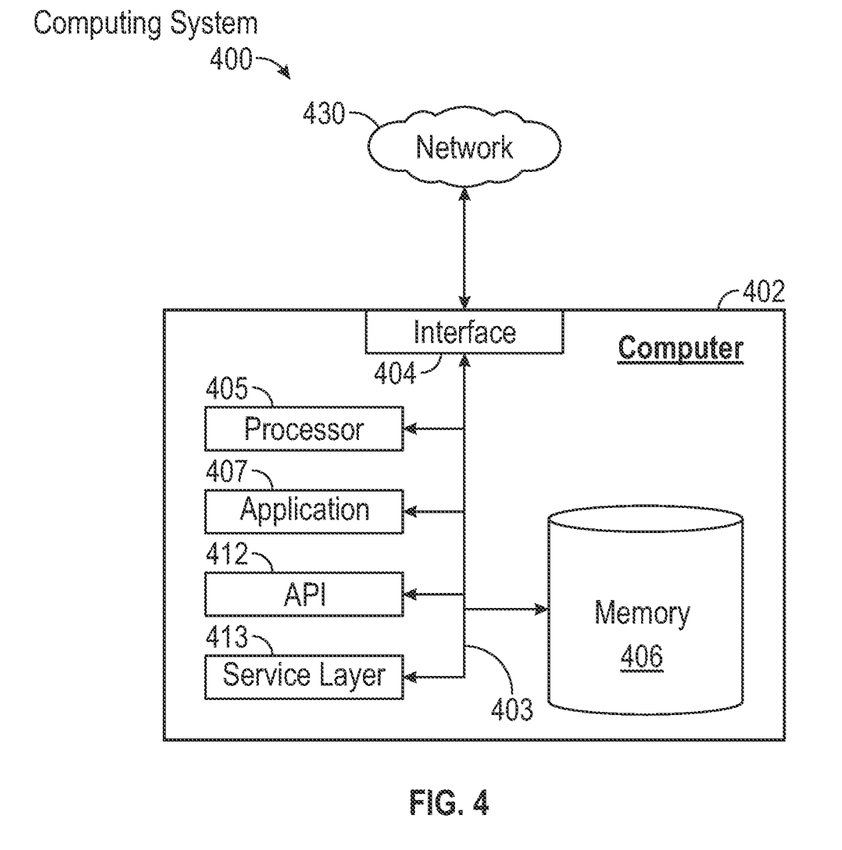
FIG. 4 shows a computer system in accordance with one or more embodiments.

Embodiments may be implemented on a computing system. FIG. 4 is a block a block diagram of a computing system (400) used to provide computational functionalities associated with described algorithms, methods, functions, processes, flows, and procedures as described in the instant disclosure, according to an implementation. The illustrated computer (402) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (402) may include a computer that includes an input device, such as a keypad, keyboard, touch screen, or other device that can accept user information, and an output device that conveys information associated with the operation of the computer (402), including digital data, visual, or audio information (or a combination of information), or a GUI.

The computer (402) can serve in a role as a client, network component, a server, a database or other persistency, or any other component (or a combination of roles) of a computer system for performing the subject matter described in the instant disclosure. The illustrated computer (402) is communicably coupled with a network (430). In some implementations, one or more components of the computer (402) may be configured to operate within environments, including cloud-computing-based, local, global, or other environment (or a combination of environments).

At a high level, the computer (402) is an electronic computing device operable to receive, transmit, process, store, or manage data and information associated with the described subject matter. According to some implementations, the computer (402) may also include or be communicably coupled with an application server, e-mail server, web server, caching server, streaming data server, business intelligence (BI) server, or other server (or a combination of servers).

The computer (402) can receive requests over network (430) from a client application (for example, executing on another computer (402)) and responding to the received requests by processing the said requests in an appropriate software application. In addition, requests may also be sent to the computer (402) from internal users (for example, from a command console or by other appropriate access method), external or third-parties, other automated applications, as well as any other appropriate entities, individuals, systems, or computers.

Each of the components of the computer (402) can communicate using a system bus (403). In some implementations, any or all of the components of the computer (402), both hardware or software (or a combination of hardware and software), may interface with each other or the interface (404) (or a combination of both) over the system bus (403) using an application programming interface (API) (412) or a service layer (413) (or a combination of the API (412) and service layer (413). The API (412) may include specifications for routines, data structures, and object classes. The API (412) may be either computer-language independent or dependent and refer to a complete interface, a single function, or even a set of APIs. The service layer (413) provides software services to the computer (402) or other components (whether or not illustrated) that are communicably coupled to the computer (402). The functionality of the computer (402) may be accessible for all service consumers using this service layer. Software services, such as those provided by the service layer (413), provide reusable, defined business functionalities through a defined interface. For example, the interface may be software written in JAVA, C++, or other suitable language providing data in extensible markup language (XML) format or other suitable formats. While illustrated as an integrated component of the computer (402), alternative implementations may illustrate the API (412) or the service layer (413) as stand-alone components in relation to other components of the computer (402) or other components (whether or not illustrated) that are communicably coupled to the computer (402). Moreover, any or all parts of the API (412) or the service layer (413) may be implemented as child or sub-modules of another software module, enterprise application, or hardware module without departing from the scope of this disclosure.

The computer (402) includes an interface (404). Although illustrated as a single interface (404) in FIG. 4, two or more interfaces (404) may be used according to particular needs, desires, or particular implementations of the computer (402). The interface (404) is used by the computer (402) for communicating with other systems in a distributed environment that are connected to the network (430). Generally, the interface (404 includes logic encoded in software or hardware (or a combination of software and hardware) and operable to communicate with the network (430). More specifically, the interface (404) may include software supporting one or more communication protocols associated with communications such that the network (430) or interface's hardware is operable to communicate physical signals within and outside of the illustrated computer (402).

The computer (402) includes at least one computer processor (405). Although illustrated as a single computer processor (405) in FIG. 4, two or more processors may be used according to particular needs, desires, or particular implementations of the computer (402). Generally, the computer processor (405) executes instructions and manipulates data to perform the operations of the computer (402) and any algorithms, methods, functions, processes, flows, and procedures as described in the instant disclosure.

The computer (402) also includes a memory (406) that holds data for the computer (402) or other components (or a combination of both) that can be connected to the network (430). For example, memory (406) can be a database storing data consistent with this disclosure. Although illustrated as a single memory (406) in FIG. 4, two or more memories may be used according to particular needs, desires, or particular implementations of the computer (402) and the described functionality. While memory (406) is illustrated as an integral component of the computer (402), in alternative implementations, memory (406) can be external to the computer (402).

The application (407) is an algorithmic software engine providing functionality according to particular needs, desires, or particular implementations of the computer (402), particularly with respect to functionality described in this disclosure. For example, application (407) can serve as one or more components, modules, applications, etc. Further, although illustrated as a single application (407), the application (407) may be implemented as multiple applications (407) on the computer (402). In addition, although illustrated as integral to the computer (402), in alternative implementations, the application (407) can be external to the computer (402).

There may be any number of computers (402) associated with, or external to, the computer system (400), each computer (402) communicating over network (430). Further, the term "client," "user," and other appropriate terminology may be used interchangeably as appropriate without departing from the scope of this disclosure. Moreover, this disclosure contemplates that many users may use one computer (402), or that one user may use multiple computers (402).

In some embodiments, the computer (402) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method to perform application whitelisting for a computer system, comprising:
   detecting, by a computer processor and in an application whitelisting database of the computer system, that a first agent entry and a second agent entry have a same machine name within the computer system;
   recording, by the computer processor and in a duplicates repository separate from the application whitelisting database, the first agent entry and the second agent entry;
   detecting, by the computer processor and in the duplicates repository separate from the application whitelisting database, that the first agent entry has a connected status;
   recording, by the computer processor and in a connected duplicates repository separate from the application whitelisting database, the first agent entry based on the connected status;
   determining, by the computer processor at least comparing the duplicates repository and the connected duplicates repository, that the second agent entry is a disconnected duplicate of the first agent entry;
   deleting, by the computer processor and in response to said determining, the second agent entry from the application whitelisting database, and
   increasing operation efficiency of the computer system by dynamically reducing, based at least on the computer processor deleting the second agent entry, a space of the application whitelisting database,
   wherein a number of times that a human analyst needs to investigate the application whitelisting database is reduced based at least on the computer processor deleting the second agent entry.

2. The method of claim 1, further comprising:
   storing, prior to deleting the second agent entry from the application whitelisting database, the second agent entry and associated information in a disconnected repository separate from the application whitelisting database.

3. The method of claim 2, further comprising:
detecting, prior to said storing, that the second agent entry has a disabled policy; and
changing, prior to said storing, the disabled policy of the second agent to a non-disabled policy.

4. The method of claim 2,
wherein the disconnected repository comprises a comma-separated-values (CSV) file.

5. The method of claim 1, further comprising:
determining that the second agent entry has a days-off value exceeding a pre-determined threshold,
wherein deleting the second agent entry from the application whitelisting database is based on the days-off value exceeding the pre-determined threshold.

6. The method of claim 4,
wherein the pre-determined threshold is specified as 90 days.

7. The method of claim 1, further comprising:
deleting, in response to deleting the second agent entry from the application whitelisting database, the first agent entry and the second agent entry from the duplicates repository.

8. A system, comprising:
a computer processor; and
memory storing instructions, when executed, causing the computer processor to:
detect, in an application whitelisting database of a computer system, that a first agent entry and a second agent entry have a same machine name within the computer system;
record, in a duplicates repository separate from the application whitelisting database, the first agent entry and the second agent entry;
detect, in the duplicates repository separate from the application whitelisting database, that the first agent entry has a connected status;
record, in a connected duplicates repository separate from the application whitelisting database, the first agent entry based on the connected status;
determine, by at least comparing the duplicates repository and the connected duplicates repository, that the second agent entry is a disconnected duplicate of the first agent entry;
delete, in response to said determining, the second agent entry from the application whitelisting database; and
increases operation efficiency of the system by dynamically reducing, based at least on the computer processor deleting the second agent entry, a space of the application whitelisting database,
wherein a number of times that a human analyst needs to investigate the application whitelisting database is reduced based at least on the computer processor deleting the second agent entry.

9. The system of claim 8, the instructions, when executed, further causing the computer processor to:
store, prior to deleting the second agent entry from the application whitelisting database, the second agent entry and associated information in a disconnected repository separate from the application whitelisting database.

10. The system of claim 9, the instructions, when executed, further causing the computer processor to:
detect, prior to said storing, that the second agent entry has a disabled policy; and
change, prior to said storing, the disabled policy of the second agent to a non-disabled policy.

11. The system of claim 9,
wherein the disconnected repository comprises a comma-separated-values (CSV) file.

12. The system of claim 8, the instructions, when executed, further causing the computer processor to:
determine that the second agent entry has a days-off value exceeding a pre-determined threshold,
wherein deleting the second agent entry from the application whitelisting database is based on the days-off value exceeding the pre-determined threshold.

13. The system of claim 12,
wherein the pre-determined threshold is specified as 90 days.

14. The system of claim 8, the instructions, when executed, further causing the computer processor to:
delete, in response to deleting the second agent entry from the application whitelisting database, the first agent entry and the second agent entry from the duplicates repository.

15. An application whitelisting system, comprising:
an application whitelisting database of a computer system;
a duplicates repository separate from the application whitelisting database;
a connected duplicates repository separate from the application whitelisting database;
a computer processor; and
memory storing instructions, when executed, causing the computer processor to:
detect, in the application whitelisting database, that a first agent entry and a second agent entry have a same machine name within the computer system;
record, in the duplicates repository, the first agent entry and the second agent entry;
detect, in the duplicates repository, that the first agent entry has a connected status;
record, in the connected duplicates repository, the first agent entry based on the connected status;
determine, by at least comparing the duplicates repository and the connected duplicates repository, that the second agent entry is a disconnected duplicate of the first agent entry;
delete, in response to said determining, the second agent entry from the application whitelisting database, and
increase operation efficiency of the computer system by dynamically reducing, based at least on said deleting the second agent entry, a space of the application whitelisting database,
wherein a number of times that a human analyst needs to investigate the application whitelisting database is reduced based at least on said deleting the second agent entry.

16. The application whitelisting system of claim 15, the instructions, when executed, further causing the computer processor to:
store, prior to deleting the second agent entry from the application whitelisting database, the second agent entry and associated information in a disconnected repository separate from the application whitelisting database.

17. The application whitelisting system of claim 16, the instructions, when executed, further causing the computer processor to:
   detect, prior to said storing, that the second agent entry has a disabled policy; and
   change, prior to said storing, the disabled policy of the second agent to a non-disabled policy.

18. The application whitelisting system of claim 16, wherein the disconnected repository comprises a comma-separated-values (CSV) file.

19. The application whitelisting system of claim 15, the instructions, when executed, further causing the computer processor to:
   determine that the second agent entry has a days-off value exceeding a pre-determined threshold,
   wherein deleting the second agent entry from the application whitelisting database is based on the days-off value exceeding the pre-determined threshold.

20. The application whitelisting system of claim 15, the instructions, when executed, further causing the computer processor to:
   delete, in response to deleting the second agent entry from the application whitelisting database, the first agent entry and the second agent entry from the duplicates repository.

* * * * *